US012682915B2

(12) United States Patent
Spirou et al.

(10) Patent No.: US 12,682,915 B2
(45) Date of Patent: Jul. 14, 2026

(54) SYSTEM AND METHOD FOR GENERATING BRAND STANDARDS FROM VOICE INPUT

(71) Applicants:Dimitrios Spirou, Oakville (CA);
David Ormonde, Oakville (CA);
Christina Spirou, Oakville (CA)

(72) Inventors: Dimitrios Spirou, Oakville (CA);
David Ormonde, Oakville (CA);
Christina Spirou, Oakville (CA)

( * ) Notice: Subject to any disclaimer, the term of this patent is extended or adjusted under 35 U.S.C. 154(b) by 220 days.

(21) Appl. No.: 18/622,993

(22) Filed: Mar. 31, 2024

(65) Prior Publication Data

US 2025/0308545 A1     Oct. 2, 2025

(51) Int. Cl.
| | |
|---|---|
| *G10L 25/18* | (2013.01) |
| *G06T 11/10* | (2026.01) |
| *G10L 15/18* | (2013.01) |

(52) U.S. Cl.
CPC ............. *G10L 25/18* (2013.01); *G06T 11/10* (2026.01); *G10L 15/1815* (2013.01)

(58) Field of Classification Search
CPC ..... G10L 25/18; G10L 15/1815; G10L 25/48; G06T 11/001
See application file for complete search history.

(56) References Cited

U.S. PATENT DOCUMENTS

| | | | | |
|---|---|---|---|---|
| 10,755,683 B1 * | 8/2020 | Baltazor | ................ | G10H 1/368 |
| 2020/0215970 A1 * | 7/2020 | Lee | ...................... | G06V 10/764 |
| 2020/0251080 A1 * | 8/2020 | Baltazor | ................ | G10H 1/368 |
| 2024/0296816 A1 * | 9/2024 | Bach | ........................ | G06T 11/00 |
| 2024/0345426 A1 * | 10/2024 | Turczan | ................ | F21S 10/002 |

OTHER PUBLICATIONS

Serena Job, "What are Brand Standards and Why do they Matter?" Digital Asset Management Mar. 4, 2024, pp. 1-14 Downloaded from https://imagekit.io/blog/brand-standards/ (Year: 2024).*
S. M. Qaisar, H. Alsharif, M. Akbar and A. Abdullah, "Automatic Speech Recognition and its Visual Perception Via a Cymatics Based Display," 2019 Advances in Science and Engineering Technology International Conferences (ASET), Dubai, United Arab Emirates, 2019, pp. 1-4 (Year: 2019).*
M. Taenzer, B. C. Wünsche and S. Müller, "Analysis and Visualisation of Music," 2019 International Conference on Electronics, Information, and Communication (ICEIC), Auckland, New Zealand, 2019, pp. 1-6 (Year: 2019).*

* cited by examiner

*Primary Examiner* — Daniel C Washburn
*Assistant Examiner* — Penny L Caudle

(57) ABSTRACT

A system and method for identifying key notes from voice input, generating color representations and cymatic shape representations. The system includes an electronic device with a computational engine implemented using Python code. The method involves processing an audio file containing voice input, to identify the key notes that prevail across noted sentiments and converting the key notes into their representative frequencies. The resulting frequencies are further processed to generate representative colors, and representative cymatic shapes. Together, these generated representations serve as foundational design elements referred to as Brand Standards, for the purposes of branding, promotion, and trademarking.

19 Claims, 3 Drawing Sheets

1000

4000

Computed wavelength corresponding to each
Key Note, represented as $\lambda KN$

5000

Computed color values corresponding to each Key Note
wavelength, represented as $KN_{RBG}$, $KN_{CMYK}$ and $KN_{HEX}$

3000

Computed frequencies corresponding to each
identified Key Note, represented as fKN

6000A

Generated and vectorized cymatic shapes corresponding
to each Key Note frequency, represented as CKN

CKN₁          CKN₂          CKNₙ

6000B

Componentized and vectorized cymatic shapes corresponding to
each Key Note. Groupings represented as CcKN

SYSTEM AND METHOD FOR GENERATING BRAND STANDARDS FROM VOICE INPUT

BACKGROUND OF THE INVENTION

The present invention relates to a system and method for identifying key notes from voice input, generating color representations and cymatic image representations. More specifically, the system and method processes a WAV file (Waveform Audio File Format) of voice input, also in the form of .wav or .wave files, as input to a coded script that identifies the key notes that prevail across identified sentiments, and converts the identified key notes to their corresponding pitch, captured as frequencies in Hertz (Hz). The conversion of a unique voice's key notes to their frequencies, characterize the voice input information into a numerical representation. The resulting frequencies are unique to the originating .wav files, providing a numerical basis for further processing.

In the digital era, the artists and design professionals face a dilemma caused by the overwhelming abundance of creative outputs flooding the market, due to the emergence of artificially generated media. Due to the abundance of marketing and promotional materials shared on a variety of platforms, creative professionals are now confronted with an ever-expanding pool of design outputs that are sourced from similar original design libraries and borrow from popular trends through the use of Large Language Models (LLMs) that leverage libraries of millions of existing creative outputs. As a result, it is increasingly difficult to differentiate creative products produced by a design professional, from those generated by a machine. Further, by generating creative outputs from a system that uses a trained LLM, it introduces the risk of inadvertent copyright and trademark infringement. Consequently, there is a need for innovative methods that provide individualized and organic design elements to creative professionals, that serve as the foundation for the development of unique and original brand identities, trademarks, and promotional footprints. These methods can enable users to develop objective, organic creative outputs that are uniquely representative of one's voice, while also providing valuable assistance in potentially avoiding inadvertent instances of copyright infringement.

There are several tools available to designers to assist with the design process, in order to create a unique identity for their clients. These include collaboration tools, idea sharing applications, design references, royalty-bearing artistic elements, and other creative sources that may serve as inspiration. These tools are paired with the creative and artistic skills of the design professional, to build a visual identity and brand elements tailored to their client. These tools may employ techniques such as generation of shapes and images from a set of textual inputs, output of color profiles typically associated with sentiments or seasons, or textual analysis to identify matches or similarities to existing creative outputs. However, these algorithms are typically limited to sampling from databases or generating outputs sourced from existing materials. On the other hand, generating foundational design components from a unique voice input, does not rely on these databases or extensive catalogues of existing art.

Additionally, one may use a logo generating service, using a combination of inputs such as keywords and selecting from visual references as a means to generate a representative creative output. This involves associating keywords to specific images, shapes, fonts, and colors, regularly updating the database, refining comparison algorithms, and continuously scanning online platforms for new content. However, these logo generating tools typically include disclaimers that any outputs delivered by the services are not verified and are not compared against known works to identify potential trademark or copyright. Complementary services can detect potential infringements by searching for matches or similarities between trademarked or copywritten works, but must be initiated as a secondary activity, separate from the original design service.

Other technologies include the means to transform acoustic vibrations to human perceptible forms such as colors, tactile vibrations, and images, to create a cross-sensory experience in response to an acoustic vibration such as music, serving as a bridge between hearing and non-hearing experiences, among other applications. These technologies may employ techniques such as identification of pitch and its frequency, in addition to their electromagnetic and tactile frequencies, and outputting the results to a translator for further processing, or a physical device. However, these algorithms are developed for musical inputs, or a recorded sound that is then visualized or transformed for tactile feedback. Further, they limited to sampling certain audio files, such as MP3 files. MP3 files are compressed and suitable for efficient storage and transmission over the internet. On the other hand, WAV files are uncompressed audio files that preserve the original audio data in its entirety.

Therefore, there is a need for a method that enables users to develop creative outputs that are uniquely representative of one's voice to serve as a foundation for brand identities, trademarks, and promotional footprints, while also providing valuable assistance in potentially avoiding inadvertent instances of copyright infringement.

In light of the devices disclosed in the known art, it is submitted that the present invention substantially diverges in design elements and methods from the known art and consequently it is clear that there is a need in the art for an improvement for a process of identifying key notes from voice input, and generating color representations and cymatic shape representations of the key notes, for the purpose of providing individualized and organic design elements to creative professionals for the development of unique and original Brand Standards, including brand identities, trademarks, and promotional footprints. In this regard, the instant invention substantially fulfills these needs.

SUMMARY OF THE INVENTION

In view of the foregoing disadvantages inherent in the known tools and processes to develop organic design elements for the purpose of branding, promotion and trademarking, the present invention provides a new system and method for identifying key notes from voice input, generating color representations and cymatic shape representations. The method comprises processing an audio file containing original voice input, to identify the key notes that prevail across noted sentiments, expressed as root notes. The method also includes the steps to converting the key notes into their representative frequencies in hertz (Hz). The method further involves processing the representative frequencies of the key notes to generate their corresponding wavelength in nanometers (nm), and generate their representative colors in RBG, CMYK and HEX values. The method further involves processing the representative frequencies of the key notes, to their representative, cymatic shapes, vectorized and componentized in SVG, WMF, EPS, PDF, CDR, and AI formats. Additionally, the system and associated method result in a collection of generated components that serve as foundational design elements, or Brand Standards, for the purposes of branding, promotion, and trademarking.

It is an objective of the present invention to provide an embodiment of the system comprising an electronic device having a processor, a memory, and a computation engine. The computation engine is designed to execute the logic required for processing the audio file and identifying the key notes in the form of root notes, and further computing their corresponding frequencies and wavelengths, in addition to executing routines for the generation of corresponding cymatic shapes. It utilizes Python code, which provides a flexible and efficient programming language for audio processing and subsequent mathematical and logical computations. The electronic device also includes input/output interfaces for receiving the audio file and communicating the results of the method. The electronic device may be in communication with a network of other devices, such as a server, to complete the analysis.

It is an objective of the present invention to provide an embodiment of the system to identify key note(s) from voice input, expressed as root notes, and to utilize the identified root notes as input to further compute the corresponding frequencies using mathematical calculations within the logarithmic scale, ensuring an accurate and reliable method of generating representations of the key notes.

It is yet another objective of the present invention to provide an embodiment of the system to identify sentiments within the voice input, and further identify their corresponding key notes, providing a broader collection of key notes from which to further compute the corresponding frequencies using mathematical calculations.

It is yet another objective of the present invention to provide an embodiment of the system to utilize Python applied to WAV files, ensuring the integrity of the audio data without compression, as opposed to MP3 files, which can lose valuable information during the compression process.

It is an objective of the present invention to provide an embodiment of the system to generate representative color values for the identified key notes, using their computed frequencies as input to compute their wavelengths, providing a precise and efficient method for generating color design elements for inclusion in Brand Standards.

It is an objective of the present invention to provide an embodiment of the system to generate representative cymatic shapes for the identified key notes, using their computer frequencies as input to a computer program, providing a precise and efficient method for generating shape design elements for inclusion in Brand Standards.

It is another objective of the present invention to provide another embodiment of the system to componentize the generated cymatic shapes for the identified key notes, generating additional shape design elements for inclusion in Brand Standards.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
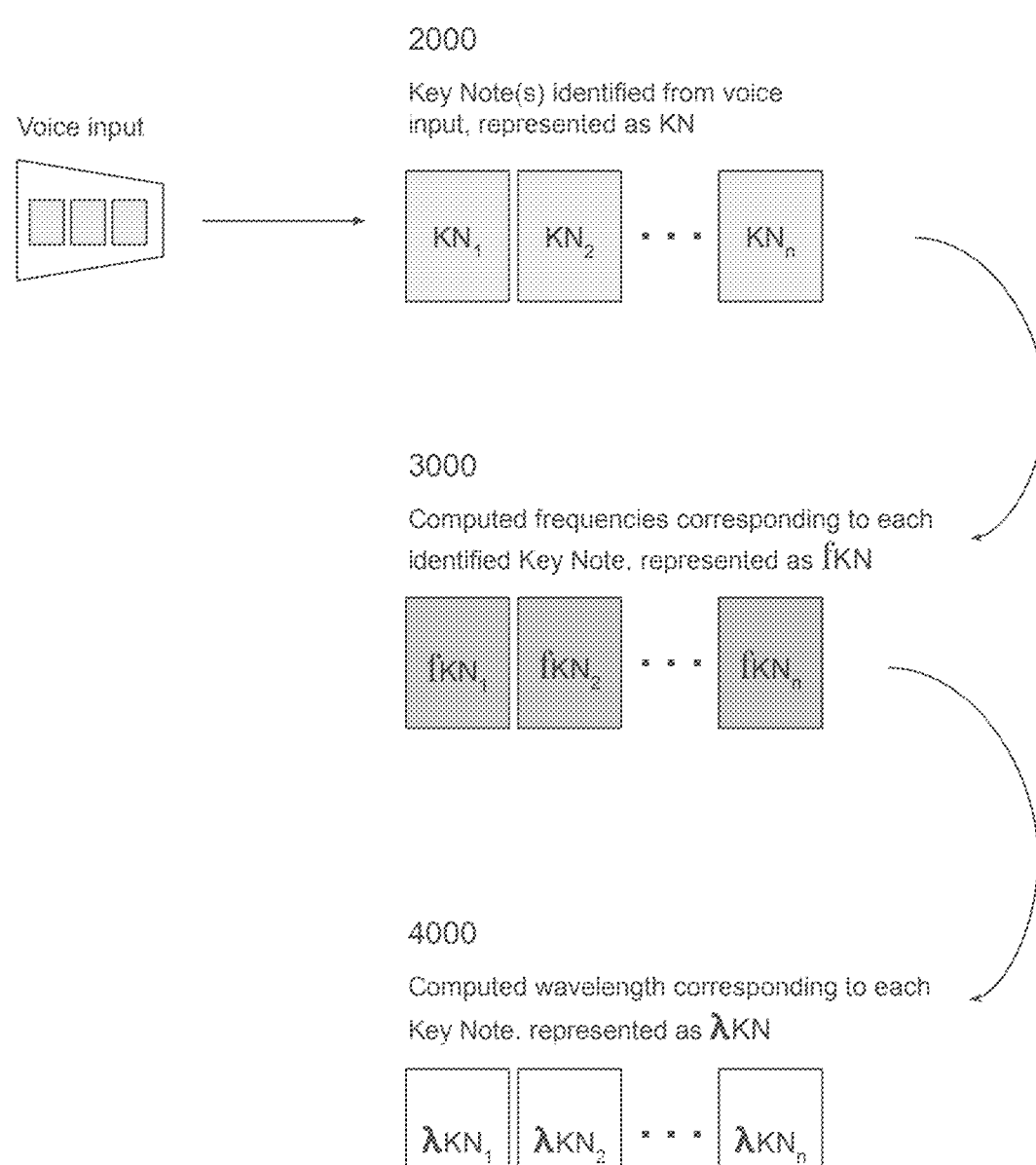
FIG. 1 shows a diagram of voice input in the form of an audio file with each Key Note identified, and processed to compute their frequencies and wavelengths, in accordance with at least one embodiment of the present invention.

Reference is made herein to the attached drawings. Like reference numerals are used throughout the drawings to depict like or similar elements of the system. For the purpose of presenting a brief and clear description of the present invention, the embodiment discussed will be used for processing an audio file containing voice input, identifying the key notes that prevail across noted sentiments and converting the key notes into their representative frequencies and wavelengths, generating representative colors, and representative cymatic shapes. The figures are intended for representative purposes only and should not be considered to be limiting in any respect. Furthermore, the described features, structures, or characteristics may be combined in any suitable manner in one or more embodiments. In the following description, numerous specific details are provided to give a thorough understanding of embodiments.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment," "first embodiment", "second embodiment", or "third embodiment" does not necessarily refer to the same embodiment.

As used herein, "computer-readable medium" or "memory" excludes any transitory signals, but includes any non-transitory data storage circuitry, e.g., buffers, cache, and queues, within transceivers of transitory signals. As used herein, "logic" refers to (i) logic implemented as computer instructions and/or data within one or more computer processes and/or (ii) logic implemented in electronic circuitry. As used herein "voice input" refers to a reference audio file and "key note" refers to the identified root note derived from the voice input. "Vectorized" refers to the process of vector tracing, where images are converted from a pixel-basis into mathematically plotted lines and shapes, suitable for scaling and for use as design elements. "Componentized" refers to the process of breaking down the generated cymatic shapes into identifiable and reusable pieces that can be independently utilized. "Brand Standard" refers to a set written guidelines that specify the colors, imagery, graphic elements, logo, icon, proper use of logo, fonts, body fonts, headline fonts, subheadline fonts, and messaging that defines your brand.

Referring now to FIG. 1, there is shown a diagram of key notes identified from voice input in accordance with one embodiment of the present invention. In one embodiment, the system and method provide steps to identify the key notes. Each key note (KN) identified from the voice input, is processed through the computation engine to compute their corresponding frequencies (fKN), and in one embodiment, is subsequently processed to compute their corresponding wavelengths (λKN).

The system and method utilize a computation engine to perform the calculations using mathematical expressions to generate the representations of the key notes in the form of frequencies and wavelengths, and further use a logical routine to generate the cymatic shapes. Logic-based routines implemented in Python Code further process the generated images to vectorize and componentize the output. The frequencies of the identified key notes are computed using a mathematical formula. The calculation of frequency of a given note is on a logarithmic scale, given its characteristic of doubling with each octave. As known to those skilled in the art, the frequency of the reference pitch, and the number of semitones away from the reference pitch are used to complete the calculation. In this context, "reference pitch" refers to the international standard pitch of A440, setting 440 Hz as the frequency of the A note above middle C note. "Semitone" refers to the interval between two adjacent notes in a 12-tone scale. By computing the representative frequency of each identified key note, various subsequent computations can be performed as part of the complete system 1000. The wavelength is computed using a mathematical formula; dividing the frequency in hertz, into the value of the speed of light in meters per second.

In the shown embodiment, identified key notes 2000 are processed using a computer program. The computer program computes the frequencies 3000. The computer program also permutates the identified key notes by several octaves and recalculates the frequencies, using the resultant frequencies to compute the wavelength within the visual spectrum 4000. For representative purposes, the number of key notes are captured as a series that can contain 'n' number of values. The number of identified key notes can vary based on the desired breadth of Brand Standard desired. For example, one can aim to identify one single dominant key note from which to derive Brand Standards, or capture a breadth of sentiments that are characterized by a number of key notes, from which to derive a more comprehensive collection of Brand Standards.

Figure 2:
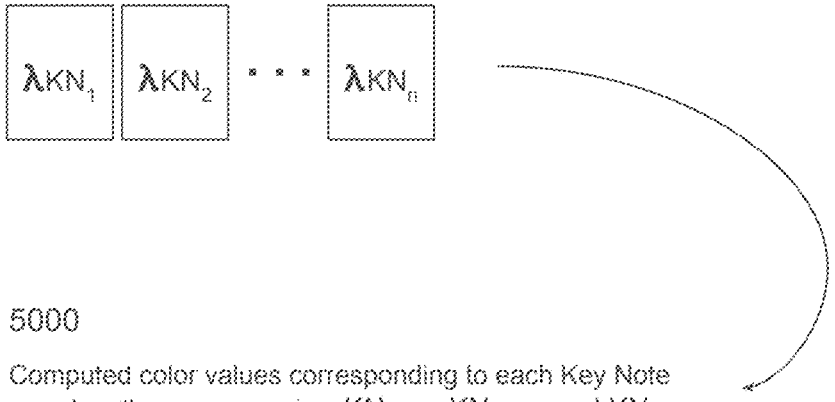
FIG. 2 shows a diagram of the wavelengths of identified Key Notes and processed to compute their color values, in accordance with one embodiment of the present invention.
Figure 2:
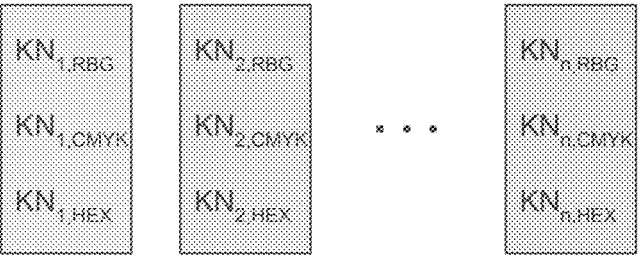

Referring now to FIG. 2, there is shown a diagram of computed wavelengths corresponding to each identified key in accordance with one embodiment of the present invention. In one embodiment, the system and method provide steps to process the wavelengths through a computer program, to compute the color values associated with each wavelength (λKN).

The system and method utilize a computer program to execute a logical routine that performs a series of computations. The wavelength in nanometers is used as input to a script implemented in Python Code, which computes its RGB color values, and subsequently converts the RGB values to CMYK and HEX color values.

In the shown embodiment, computed wavelengths 4000 are processed using a computer program. The computer program computes the color values 5000.

Figure 3:
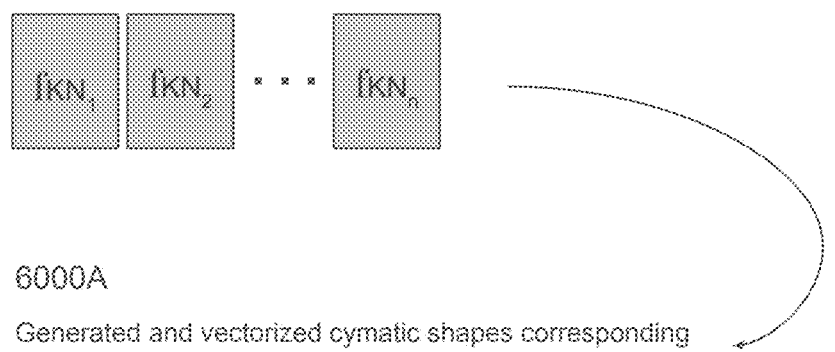
FIG. 3 shows a diagram of the frequencies of identified Key Notes and processed to generate their corresponding cymatic shapes, and further componentized in accordance with at least one embodiment of the present invention.
Figure 3:
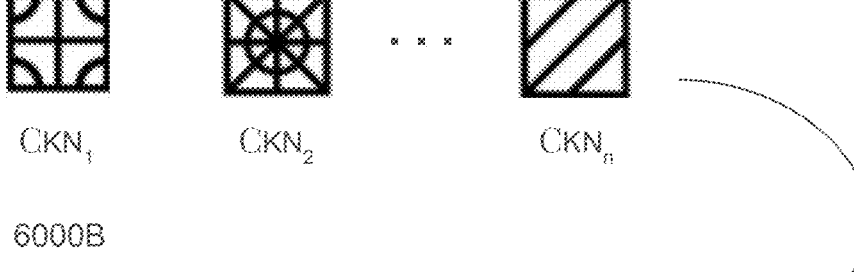
Figure 3:
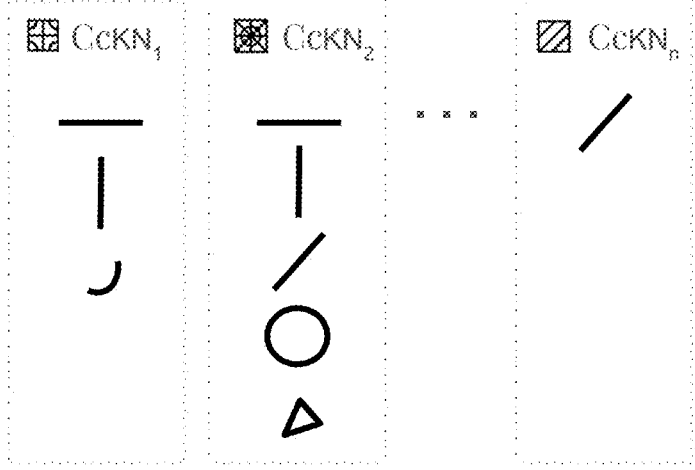

Referring now to FIG. 3, there is shown a diagram of computed frequencies corresponding to each identified key in accordance with one embodiment of the present invention. In one embodiment, the system and method provide steps to process the frequencies through a computer program, to generate vectorized cymatic images (CKN) associated with each frequency (fKN) in SVG, WMF, EPS, PDF, CDR, and AI formats. In yet another embodiment, the system and method provide steps to componentize and vectorize the generated cymatic images (CKN) into groupings (CcKN) in SVG, WMF, EPS, PDF, CDR, and AI formats.

The system and method utilize a computer program to execute a logical routine that performs a series of computations. The frequency in hertz is used as input to a script implemented in Python Code, which generates the corresponding vectorized cymatic image in SVG, WMF, EPS, PDF, CDR, and AI formats, and subsequently componentizes the image into individual vectorized images in SVG, WMF, EPS, PDF, CDR, and AI formats.

In the shown embodiment, computed frequencies 3000 are processed using a computer program. The computer program generates vectorized cymatic shapes 6000A in SVG, WMF, EPS, PDF, CDR, and AI formats.

In the shown embodiment, the system has generated independent, vectorized components 6000B from the cymatic shapes 6000A. The system allows for the generation of compound components, that are the result of two or more components combined to form a shape. The system 1000 provides for manual or automated creation of the cymatic shape components. By using this system and method, the additional shape components enable a broader set of design elements for inclusion in the Brand Standard.

In one embodiment, the system for identifying key notes from voice input, generating color representations and cymatic shape representations comprises an electronic device having a processor and a memory, wherein the electronic device is adapted to read an audio file from an input device. The system includes a computation engine executed by a computer program, which serves as a fundamental component for performing the method described in this invention. The computation engine is designed to efficiently compute the frequencies of the identified key notes, the permutations of the key notes, the wavelengths, and the RGB, CMYK and HEX color values. The computer program comprises logic, that when executed by the processor causes the electronic device to process the audio file to identify key notes, to generate a mathematical representation of each key note in the form of a frequency, wherein the audio file comprises one or more key notes. Moreover, the computer program is adapted to permutate the key notes by several octaves, and generate the corresponding frequency, and then further process each frequency to compute the corresponding wavelength. Once processed, the computer program executes a routine that computes the RGB color values from the wavelength, and further converts the RGB values to CMYK and HEX color values. Additionally, the computer program processes the aforementioned frequencies to generate cymatic shapes. The computer program is also adapted to vectorize the cymatic shapes, and further componentize the cymatic shapes to generate additional design elements for the Brand Standard.

By executing the logic within the computer program, the electronic device performs these operations, processing an audio file containing voice input, identifying the key notes and computing their representative frequencies and wavelengths, computing representative colors, and generating representative cymatic shapes. These functionalities contribute to the system's ability to generate foundational design elements from voice input, for the purposes of branding, promotion, and trademarking.

In one embodiment, the system 1000 utilizes Python code as a programming language to implement the computer program and related operations.

In the context of audio processing, there are several common methods that can be applied to identify sentiments or emotions captured within a particular audio file. Sentiments including, but not limited to, sadness, grief, fear, sarcasm, excitement, awe, and contentment can be identified through the tone of a speaking voice. When the audio file is processed, the key notes associated with each sentiment can be identified. In one embodiment, the system identifies sentiments and the key notes associated with them. These can then be processed with the same system and method to compute representative frequencies and wavelengths of the key notes, compute their representative colors, and generate representative cymatic shapes.

In one embodiment, the electronic device is adapted to correspond to any remote electronic device that is configured to communicate with (or facilitate communication with) one or more other wireless communication devices over a wireless communications system. The electronic device includes logic configured to receive and/or transmit information. If the communication device corresponds to a wireless communications device, the logic configured to receive and/or transmit information can include a wireless communications interface such as Bluetooth, Wi-Fi, Wi-Fi Direct, Long-Term Evolution (LTE) Direct, or other similar wireless protocols. This interface may consist of a wireless transceiver and associated hardware, such as an RF antenna, a MODEM, and a modulator/demodulator. Alternatively, the logic configured to receive and/or transmit information can correspond to a wired communications interface, such as a serial connection, a USB or Firewire connection, or an Ethernet connection through which the Internet can be accessed.

The electronic device further includes logic configured to process information. This processing logic typically includes a processor that enables various operations to be performed. Examples of processing tasks that can be carried out by the logic configured to process information include determinations, establishing connections, making selections between different information options, performing data evaluations, interacting with sensors connected to the communication device to conduct measurements, and converting information from one format to another (e.g., between different protocols such as .wav to .mp3, etc.). Additionally, the electronic device includes logic configured to store information. The storage logic comprises a non-transitory memory and associated hardware, such as a memory controller. The non-transitory memory can be any form of storage medium known in the art, including but not limited to non-transitory RAM, flash memory, ROM, erasable programmable ROM (EPROM), EEPROM, registers, hard disk, removable disk, CD-ROM, or any other suitable storage medium. The logic configured to store information may also encompass software that, when executed, enables the associated hardware to perform its storage function(s).

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method for generating foundational design elements, or Brand Standards, from voice input, comprising:
   processing an audio file containing original voice input, to identify the key notes, expressed as root notes;
   wherein the audio file comprises multiple key notes;
   processing each key note to compute a representative frequency in hertz;
   processing each representative frequency to compute a wavelength in nanometers, corresponding to each identified key note;
   processing each wavelength corresponding to each identified key note to generate representative color values in RBG, CMYK and HEX, for each identified key note;
   processing each frequency representing an identified key note, to generate a cymatic shape, vectorized in SVG, WMF, EPS, PDF, CDR, and AI formats;
   processing each vectorized cymatic shape, generating independent, vectorized components that make up the corresponding cymatic shape, in SVG, WMF, EPS, PDF, CDR, and AI formats;
   generating a Brand Standard package including the key notes identified from voice input, color values associated with the key notes, and vectorized and componentized shapes associated with the key notes.

2. The method of claim 1, wherein the audio file is a .wav file.

3. The method of claim 2, wherein the frequency is computed via Python Script.

4. The method of claim 3, wherein the wavelength is computed via Python Script.

5. The method of claim 4, wherein the color values are computed via Python Script.

6. The method of claim 5, wherein the cymatic shapes are generated via Python Script.

7. The method of claim 6, wherein the cymatic shapes componentization is executed via Python Script.

8. The method of claim 1, further comprising:
   identification of sentiments within the voice input, and further identifying their corresponding key notes, via analysis of an audio file containing voice input.

9. A system for generating foundational design elements, or Brand Standards, from voice input, the system comprising:
   an electronic device having a processor and a memory, wherein the electronic device is adapted to read an audio file from an input device;
   wherein the audio file contains original voice input;
   a computer program having logic, that when executed by the processor causes the electronic device to:
   process the audio file to identify key notes expressed as root notes;
   wherein the audio file comprises one or more key notes;
   process each key note to compute a representative frequency for each key note in hertz;
   process each representative frequency to compute a wavelength in nanometers for each key note;

process each wavelength corresponding to each identified key note to generate representative color values in RBG, CMYK and HEX, for each identified key note;

process each frequency representing an identified key note, to generate a cymatic shape, vectorized in SVG, WMF, EPS, PDF, CDR, and AI formats;

process each vectorized cymatic shape, generating independent, vectorized components that make up the corresponding cymatic shape, in SVG, WMF, EPS, PDF, CDR, and AI formats;

generating a Brand Standard package including the key notes identified from voice input, color values associated with the key notes, and vectorized and componentized shapes associated with the key notes.

10. The system of claim 9, wherein the input device is selected from the following: DVDs, CDs, hard disk drives, magnetic tape, cloud storage, digital audio files, and servers for streaming media over networks.

11. The system of claim 9, wherein a sample comprising of the voice input and the generated components derived from the voice, including the root notes, colors, and vectorized shapes, is stored on non-transitory medium.

12. The system of claim 9, wherein the electronic device is adapted to correspond to any remote electronic device that is configured to communicate with one or more other wireless communication devices over a wireless communications system.

13. The system of claim 9, wherein the audio file is a ".wave" file.

14. The system of claim 13, wherein the frequency is computed via Python Script.

15. The system of claim 14, wherein the wavelength is computed via Python Script.

16. The system of claim 15, wherein the color values are computed via Python Script.

17. The method of claim 16, wherein the cymatic shapes are generated via Python Script.

18. The method of claim 17, wherein the cymatic shapes componentization is executed via Python Script.

19. The system of claim 1, wherein the computer program is further adapted to:

identify of sentiments within the voice input, and further identifying their corresponding key notes, via analysis of an audio file containing voice input.

\* \* \* \* \*